UNITED STATES PATENT OFFICE.

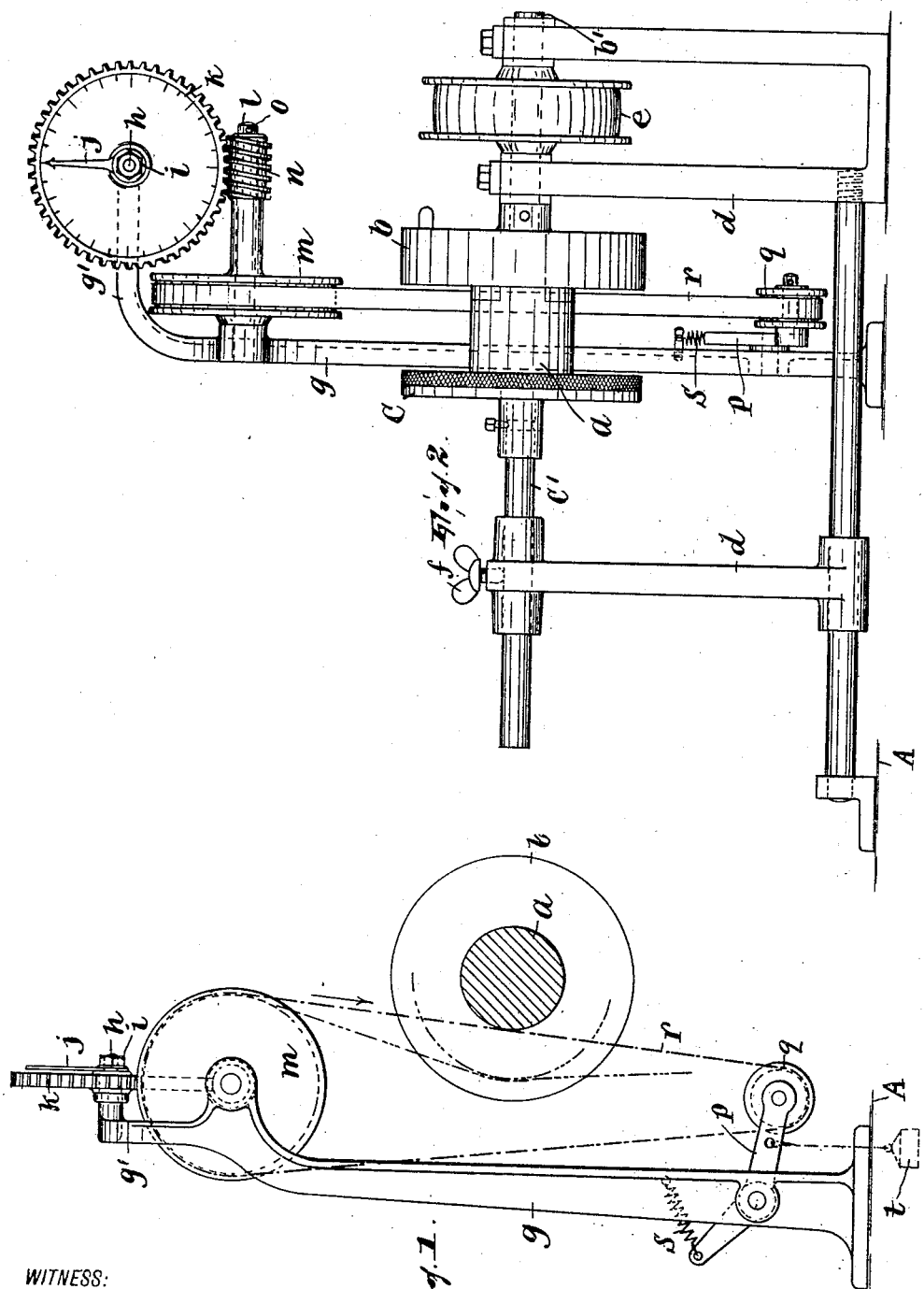

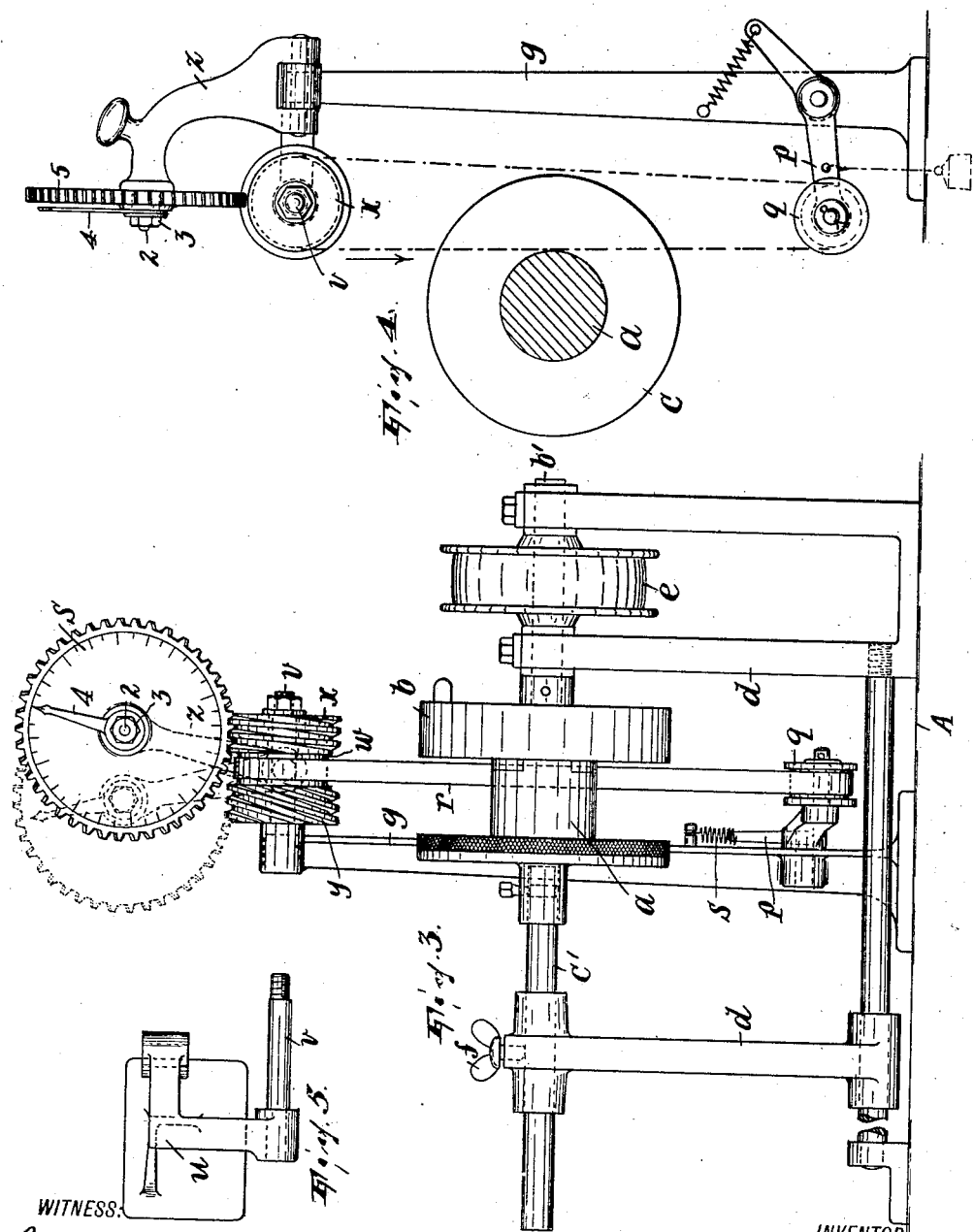

HAIGAZN H. KURKJIAN, OF PATERSON, NEW JERSEY.

APPARATUS FOR MEASURING RIBBONS AND THE LIKE.

1,246,285.  Specification of Letters Patent.  Patented Nov. 13, 1917.

Application filed December 24, 1915. Serial No. 68,562.

*To all whom it may concern:*

Be it known that I, HAIGAZN H. KURKJIAN, an Armenian, residing at Paterson, in the county of Passaic and State of New Jersey, have invented certain new and useful Improvements in Apparatus for Measuring Ribbons and the like, of which the following is a specification.

This invention relates to apparatus for measuring ribbons and other attenuated flexible pieces and it has for its object to provide a measuring apparatus of this class whereby the operations attending the measuring may be accomplished with greater facility and convenience than with apparatus heretofore proposed, and whereby greater accuracy in the measuring may be obtained. To accomplish these objects I provide a fairly taut continuous belt having one stretch thereof adapted to bear yieldingly against the rotating roll of material being measured and serving as a part of the moving indicator means of the apparatus. By using a belt in this way it is a comparatively simple matter for the operator to bring the measuring apparatus and the roll on which the material is to be wound into working relation to each other and, in addition, I avoid all objectionable vibration and obtain almost perfect smooth running of the moving parts of the measuring apparatus. In the preferred construction, the belt is the prime element in a transmission train terminating in the indicator proper, and, further, it is stretched around spaced rotary supports one of which may form a part of such train and one of which, also, is itself yieldingly supported.

The invention includes also a novel construction of measuring means whereby the movable indicator may travel at two different rates of speed according to the length of the material being measured.

In the accompanying drawings,

Figures 1 and 2 are side and front elevations of the improved measuring apparatus in operative relation to the roll on which to wind the material being measured, Fig. 2 also showing the means for rotating said roll;

Figs. 3 and 4 are front and side elevations of the apparatus modified to include a movable indicator adapted to travel at two different rates of speed; and, Fig. 5 is a detail of what appears in Figs. 3 and 4.

The roll or block $a$ on which the material to be measured is wound is supported in a well-known manner between the head-stock $b$ and tail-stock $c$ carried by the shafts $b'$ and $c'$, respectively, arranged in a suitable frame $d$, as shown. The shaft $b'$ may be driven by a belt (not shown) extending around the pulley $e$ on said shaft. The tail-stock $c$ is freely revoluble on the shaft $c'$, which is shiftable toward and from the head-stock to accommodate various widths of blocks $a$ and to effect the clamping of the blocks between the head and tail-stocks and their removal and may be held where adjusted by a thumb-screw $f$.

On the table or other support A on which the above-described means for winding the ribbon or the like is mounted, and back of said means, is arranged a standard $g$ having its upper end bent off laterally, as at $g'$, and provided with a stud $h$ on which is fixed, by a nut $i$, a pointer $j$ and on which is journaled an indicator $k$ which rotates with reference to the pointer and may be provided with a continuous scale, as shown, and in the present instance is in the form of a worm-wheel. The stud $h$ is horizontal and at right angles to the axis of winding, so that the dial of the indicator $k$ faces the operator.

Parallel with the axis of winding there projects from the standard $g$ a stub-shaft $l$ on which is journaled a pulley $m$ having an axial projection including a worm $n$ meshing with the teeth of the worm-wheel $k$, the pulley being retained on the stub-shaft by a pin $o$ or other means.

Below the stub-shaft $l$ there is fulcrumed in the standard $g$ a lever $p$ in which is journaled a pulley $q$. The two pulleys $m$ and $q$ afford supports for a continuous belt $r$ which is designed to bear against the roll of ribbon on the rotating block $a$ and be frictionally driven thereby at the same surface speed as the ribbon. The arm of the lever (which is fulcrumed on an axis parallel with the stub-shaft $l$) which supports the pulley $q$ is normally drawn away from the pulley $m$ by some suitable means, as the spring $s$ connecting said lever with the standard, or a weight $t$ suitably suspended from said lever. The arrangement is such that the stretch of the belt $r$ which is the nearer to the block $a$ bears against the periphery of the latter upon its being operatively clamped between the head- and tail-stocks. Upon the winding of the ribbon being proceeded with, as the wound package increases in diameter said stretch of the belt assumes a more or less flexed form as indicated by the broken line in Fig. 1, the lever *p* shifting, restricted by the spring or weight, to allow the pulley *q* to approach the pulley *m*. This arrangement practically eliminates vibration, although the winding may proceed at high speed; and it has this further important advantage that the operator can quickly and with great convenience introduce an empty block in position for the winding and remove the filled block. It will also be apparent that by utilizing a flexible means, such as a belt, the indicating means has a superior grip on the package being wound, so that greater accuracy in the measuring is obtained.

In the construction shown in Figs. 3 to 5 the apparatus is substantially the same as that already described except with reference to the indicating means, which as shown in these figures is designed to permit the indicator to be rotated at a slower speed when, for instance, a 5000-yard length of material is to be measured than when a 1000-yard length is to be measured, so that if when set at one speed one complete revolution of the indicator would represent 1000 yards measured on being set at the other speed one complete revolution of the indicator would now represent 5000 yards measured. Here the standard *g* has an angular head *u* supporting in one arm a stub-shaft *v* on which is journaled the pulley *w* affording the upper support for the belt *r* and having worms *x*, *y*, formed one on each side thereof. In the other arm of the head is fulcrumed a bracket *z* having a stud 2 on which is fixed, by means of the nut 3, the pointer 4. 5 is a worm-wheel having dial markings thereon and journaled on said stud. The worms *x* and *y* are of different pitch. When the bracket is shifted to the right, so that the worm-wheel engages the worm *x*, the latter will rotate with reference to the pointer at one speed; but when the bracket is shifted to the left, so that the worm-wheel engages the worm *y*, the worm-wheel will rotate at another speed. Thus, according as the worm-wheel stands engaged with the right or left worm the operator knows that the apparatus is set to indicate according to one or the other of two different standards of measurement.

Having thus fully described my invention, what I claim as new and desire to secure by Letters Patent is:—

1. In combination, the rotary device on which to wind the material to be measured, and a measuring apparatus including a moving indicating means having as a part thereof a continuous belt, said belt having a stretch thereof yieldingly bearing against said device, and spaced supporting members around which said belt extends, one of said members being free to yield toward the other.

2. In combination, the rotary device on which to wind the material to be measured, and a measuring apparatus including a moving indicating means having as a part thereof a continuous belt, said belt having a stretch thereof yieldingly bearing against said device, and spaced supporting members around which said belt extends, one of said members being elastically cushioned and yieldable toward the other.

3. In combination, the rotary device on which to wind the material to be measured, and a measuring apparatus including an indicating train having as a part thereof a continuous belt and as another part a rotary belt-support around which said belt extends, said belt having a stretch thereof yieldingly bearing against said device, and another belt support around which the belt extends, one of said supports being free to yield toward the other.

4. In combination, the rotary device on which to wind the material to be measured, and a measuring apparatus including an indicating train having as a part thereof a continuous belt and as another part a rotary belt-support around which said belt extends, said belt having a stretch thereof yieldingly bearing against said device, and another belt support around which the belt extends, one of said supports being elastically cushioned and yieldable toward the other.

5. In combination, a support, a two-part driving member having gear-portions of different pitch, and measuring means fulcrumed in said support and including a rotary indicator gear, said means being movable on its fulcrum to bring said gear into mesh with either one and out of gear with the other of said gear-portions and vice versa.

In testimony whereof I affix my signature.

HAIGAZN H. KURKJIAN.